United States Patent
Westerkowsky

(10) Patent No.: US 10,620,942 B2
(45) Date of Patent: Apr. 14, 2020

(54) METHOD FOR ADAPTING FIRMWARE OF A WIRELESS COMMUNICATION DEVICE

(71) Applicant: GEMALTO M2M GMBH, Munich (DE)

(72) Inventor: Frank Westerkowsky, Berlin (DE)

(73) Assignee: THALES DIS AIS DEUTSCHLAND GMBH, Munich (DE)

( * ) Notice: Subject to any disclaimer, the term of this patent is extended or adjusted under 35 U.S.C. 154(b) by 397 days.

(21) Appl. No.: 15/507,817

(22) PCT Filed: Aug. 18, 2015

(86) PCT No.: PCT/EP2015/068935
§ 371 (c)(1),
(2) Date: Mar. 1, 2017

(87) PCT Pub. No.: WO2016/034404
PCT Pub. Date: Mar. 10, 2016

(65) Prior Publication Data
US 2017/0286094 A1    Oct. 5, 2017

(30) Foreign Application Priority Data
Sep. 2, 2014  (EP) .................................. 14183145

(51) Int. Cl.
*G06F 9/44* (2018.01)
*G06F 8/658* (2018.01)
(Continued)

(52) U.S. Cl.
CPC .............. *G06F 8/658* (2018.02); *G06F 8/654* (2018.02); *H04W 4/70* (2018.02); *G06F 8/65* (2013.01)

(58) Field of Classification Search
CPC ............ G06F 8/658; G06F 8/654; G06F 8/65; H04W 4/70
See application file for complete search history.

(56) References Cited

U.S. PATENT DOCUMENTS

2004/0261073 A1*  12/2004  Herle ...................... G06F 8/65
                                                 717/173
2004/0267833 A1*  12/2004  Meller .................... H03M 7/30
                             (Continued)

FOREIGN PATENT DOCUMENTS

GB        2 227 584 A       8/1990

OTHER PUBLICATIONS

International Search Report (PCT/ISA/210) dated Oct. 15, 2015, by the European Patent Office as the International Searching Authority for International Application No. PCT/EP2015/068935.
(Continued)

*Primary Examiner* — Jae U Jeon
(74) *Attorney, Agent, or Firm* — Buchanan Ingersoll & Rooney PC

(57) ABSTRACT

In a method for adapting a firmware configured to control a wireless communication device, a first firmware is stored in a first storage area, and at least one delta encoding package is stored in at least one second storage area. A rule manager is configured to provide identification information indicating at least one delta encoding package. Bootstrap software is configured to, upon startup, retrieve the first firmware from the first storage area, retrieve from the rule manager identification information indicating at least one delta encoding package retrieve the indicated at least one delta encoding package from the second storage area, combine said first firmware and the at least one delta encoding package to a second firmware by way of a differential upgrade, and start the second firmware.

13 Claims, 5 Drawing Sheets

(51) Int. Cl.
*H04W 4/70* (2018.01)
*G06F 8/654* (2018.01)
*G06F 8/65* (2018.01)

(56) References Cited

U.S. PATENT DOCUMENTS

| | | | |
|---|---|---|---|
| 2005/0060530 A1* | 3/2005 | Lin | G06F 8/65 |
| | | | 713/2 |
| 2005/0132382 A1* | 6/2005 | McGuire | G06F 8/658 |
| | | | 719/311 |
| 2007/0300205 A1 | 12/2007 | Scian et al. | |
| 2008/0216066 A1* | 9/2008 | Oh | G06F 8/658 |
| | | | 717/173 |
| 2010/0325622 A1* | 12/2010 | Morton | G06F 8/654 |
| | | | 717/168 |
| 2011/0113419 A1 | 5/2011 | Ewington et al. | |
| 2012/0096104 A1* | 4/2012 | Hironaka | G06F 8/654 |
| | | | 709/212 |
| 2012/0102477 A1* | 4/2012 | Kim | G06F 8/654 |
| | | | 717/169 |
| 2013/0210404 A1 | 8/2013 | Curtis | |

OTHER PUBLICATIONS

Written Opinion (PCT/ISA/237) dated Oct. 15, 2015, by the European Patent Office as the International Searching Authority for International Application No. PCT/EP2015/068935.

\* cited by examiner

METHOD FOR ADAPTING FIRMWARE OF A WIRELESS COMMUNICATION DEVICE

FIELD OF THE INVENTION

The present invention relates to a method for adapting firmware of a wireless communication device. The invention further relates to a wireless communication device configured to adapt its firmware.

BACKGROUND OF THE INVENTION

Generally, in the field of wireless communication, in particular communication between machines, so-called machine-to-machine (M2M) communication, it is known that the wireless communication devices, at least the incorporated embedded communication units, so-called M2M modules, are more and more designed to provide just as less resources as possible. Such resources can in particular comprise volatile and non-volatile memory. Such memory is dedicated to store above all the device's firmware. The firmware is—in the field of embedded systems—the software program that fulfills all tasks of the respective wireless communication device. The respective firmware therefore conforms in particular to the operating software of the machine-to-machine modules or of other embedded communication units of the mentioned devices.

In this context the problem appears, that throughout the lifetime of a wireless communication device the firmware will most likely not stay constant. There are many reasons to provide adaptations of the firmware, the most important ones are to provide bug fixes, e.g. in case of security related bugs, to provide complete new releases or to provide adaptations for certain environments. Additionally there is a growing need for a variety of functional and configurative adaptations of the wireless communication devices in particular for optimally operating them in different operator's wireless networks.

The solutions known in the art for updating the firmware require a certain range of available resources, in the most common cases at least enough memory space to store both the old and active and the new firmware at the same time.

It is obvious that this precondition is incompatible with the described demand for as less resources as possible. This is in particular true when it is made aware that this amount of resources—as described for the solutions of the prior art—is only needed during the update procedure, but not during the real runtime period.

Further it is required in the field of M2M devices that such a firmware update is conducted remotely, that means without a person having to travel e.g. to remotely installed metering devices, or that a car equipped with a wireless communication device had not to come to the garage for the update.

To summarize there is a growing demand for solving the problem of remotely updating wireless communication devices with limited resources.

SUMMARY OF THE INVENTION

It is therefore a goal of the invention to provide a solution for the mentioned demands. For this it is according to a first aspect of the invention suggested a method for adapting a firmware configured to control a wireless communication device according to claim 1. It is further suggested according to a second aspect of the invention a wireless communication device according to claim 10.

According to a first aspect of the invention addressed problem is solved by a method for adapting a firmware configured to control a wireless communication device, the wireless communication device comprising at least one storage unit a bootstrap software and a rule manager wherein a first firmware is stored in a first storage area, the first storage area being part of the at least one storage unit, at least one delta encoding package is stored in at least one second storage area, the second storage area being part of the at least one storage unit, the rule manager is configured to provide identification information indicating at least one delta encoding package, the method comprising the steps, for the bootstrap software:

upon startup retrieving the first firmware from the first storage area, retrieving from the rule manager identification information indicating at least one delta encoding package retrieving the indicated at least one delta encoding package from the second storage area, combining said first firmware and said at least one delta encoding package to a second firmware by way of a differential upgrade, starting said second firmware.

According to the inventive method the wireless communication device is equipped with at least one storage unit for storing a first firmware and delta encoding packages. In the storage unit a first firmware and at least one delta encoding package are stored. It is both encompassed by the invention that the firmware and the delta encoding packages are loaded either upon delivery or in a later step, e.g. by cable or wirelessly on site updating.

The firmware and the delta encoding packages are stored either in the same or different storage units. It is also possible that some delta encoding packages are stored with the firmware and others in a storage area of another storage unit.

Present invention enables the wireless communication device to launch a differential upgrade process of the firmware by providing relevant information about delta encoding packages, in particular due to parameter changes, to a bootstrap software.

According to the invention the method starts with powering on the wireless communication device, which steps are handled by the bootstrap software.

This bootstrap software generally conducts tasks in preparation of starting the firmware of the wireless communication device. Typically the bootstrap software is the first piece of software to be called after powering on. However the bootstrap software is preferably further configured—before running its starting logic—to branch to another software program, like the rule manager, and upon return to proceed with the envisaged tasks.

In a first step the bootstrap software retrieves the first firmware from the first storage area. The information where the first firmware is located is either preconfigured or parameterized through configuration storage means which survive a system restart. This preferably also applies to the access to the delta encoding packages.

As a separate step the bootstrap software retrieves information about the need to carry out a firmware upgrade with at least one delta encoding package. This information is retrieved from a rule manager, which is preferably a part of the firmware or alternatively a software program running in parallel to the firmware. Following the rule managers decision to conduct a firmware upgrade with at least on delta encoding package, this decision is provided to the bootstrap software with identification information indicating the at least one delta encoding package. It is part of the invention to execute the two mentioned steps in different order.

Following the notice to the bootstrap software about the decision to conduct the firmware upgrade, the bootstrap software retrieves the indicated at least one delta encoding package from its storage area. After the retrieval step the bootstrap software combines the retrieved first firmware with the retrieved at least one delta encoding package by way of differential upgrade to a second firmware. It is also encompassed by the inventive method that the differential upgrade process is conducted by a separate software program, which is called from the bootstrap loader.

After the process of combining has concluded the second firmware is started. That means the bootstrap software hands over the control to the second firmware and terminates.

With respect to the first firmware it is in a first embodiment intended that this is a fully executable firmware. Typically this is the firmware where the wireless communication device is delivered from factory and which is being started upon initial startup. It can also be a fully executable firmware which is already the result of a previously conducted update process, be it following present inventive method, or be it following other means.

Alternatively according to the inventive method it can also be a firmware that requires an update step before being able to be executed. That means as such—that is without said update steps—this peculiar firmware does not allow operating the wireless communication device.

The delta encoding packages are meant as comprising the required data to execute the differential upgrade of a first firmware to a second firmware different from the first firmware. Those data basically comprise changes between first firmware and second firmware, in particular instructions to change the content of the first firmware, additional required resources resp. files etc. Known formats for delta encoding packages are the VDelta format (described by Hunt J., Vo K., Tichy W.: Delta Algorithms: An Empirical Analysis, ACM Transactions on Software Engineering and Methodology Vol. 7, No. 2, 1998, Pp. 192-214) and the VCDiff format (described by Kom D., Vo K.: Engineering a Differencing and Compression Data Format, USENIX 2002 Annual Technical Conference Paper, 2002, Pp. 219-228). To further minimize the memory requirements the delta encoding packages and or the first firmware is stored in compressed form and thus will be decompressed upon retrieval.

Advantage of the proposed solution is that it requires only minimal memory resources compared to the known solutions, as there is no need to store two full firmwares within the flash memory. Further it allows a flexible reaction on findings of the rule manager, in terms of which one or more delta encoding package is applicable to the current situation.

It is in a preferred embodiment proposed that the step of combining the first firmware with at least two delta encoding packages comprises an incremental update of the first firmware by updating the first firmware by at least two delta encoding packages in an order defined by the identification information retrieved from the rule manager. This embodiment in particular allows missing one upgrade at a first time and at a later occasion conducting all single update steps with respective delta encoding packages. This makes the upgrade procedure more robust upon missed upgrades.

Generally it is envisaged to carry out the combining step in the operating memory of the wireless communication device. This leads to the situation that the bootstrap software after initiating the combination step directly hands over control to the second firmware which is at that point in time available in the operating memory. This also means that this combination step needs to be carried out each time the wireless communication device is started.

On the other hand this option further allows storing the first firmware in a non rewritable memory, as is foreseen according to another preferred embodiment. This is advantageous as it a) does not populate the limited and comparably expensive flash memory and b) is more reliable in terms of environmental impact or defective memory blocks.

Alternatively to the option to handle the second firmware in the operating memory it is proposed, according to another embodiment, a method, with the wireless communication device comprising a volatile memory, wherein the method comprises, after the step of combining, storing the second firmware in the first storage area, and the step of starting second firmware comprises loading second firmware from first storage area in volatile memory and executing said loaded second firmware.

With this embodiment the second firmware is stored in the first storage area and thus is retrieved upon the next startup of the wireless communication device. In case the first storage area does not provide enough space to hold the first and the second firmware, the first firmware is overwritten.

The two alternatives differ not only in the startup phase, but also in the case where based on the first firmware an upgrade with a different at least one delta encoding package needs to be carried out. With the first alternative this is possible by simply indicating to the bootstrap software which delta encoding package is to select for the next startup of the wireless communication device.

For the second alternative it is suggested in another embodiment a method wherein at least two delta encoding packages are stored in the at least one second storage area, the two delta encoding packages comprising at least: a downgrade package and an upgrade package, wherein the step of combining comprises the following steps:
  executing a differential downgrade of the first firmware by differential downgrade instructions being part of the downgrade package,
  storing result of differential downgrade in a first or second storage area,
  executing differential upgrade of the result of differential downgrade by differential upgrade instructions being part of the upgrade package,
  storing result of differential upgrade as second firmware in the first storage area.

Depending on the selected technology for the differential upgrade, the downgrade package is either a different or the same package as the delta encoding package used for the upgrade from the firmware to the second firmware created in the previous upgrade process.

In any case the solution is based on the intent that first the earlier created second firmware is downgraded to the initial first firmware and then this reconstructed first firmware is upgraded with at least one different delta encoding package to a new second firmware. This newly build second firmware is eventually stored in the first storage area, in particular by overwriting the previously stored firmware. Preferably the result of the differential downgrade is also stored in the first storage area, and from there the differential upgrade step is carried out.

A key role in the proposed inventive method and its embodiments plays the rule manager. As set out above, the bootstrap software gets from the rule manager the information which at least one delta encoding package is to retrieve for combination with the stored first firmware. Depending on the use case the behavior of the rule manager can be different. According to a first scenario it is proposed a method wherein the rule manager is configured to execute the steps of:

checking for a change of an operating parameter,
in case a change is detected:
determine at least one delta encoding package based on changed operating parameter,
providing to the bootstrap software an identification information indicating the determined at least one delta encoding package,
handing over control to the bootstrap software.

This embodiment handles the use case of a wireless communication device already operated in the field. During runtime the rule manager is configured to detect changes of an operating parameter. The operating parameter is any parameter describing the operating environment or a received message. Alternatively it is the result of a request to a remote server. The operating parameter can additionally be a combination of more than one available parameter. Hence the respective operating parameter is the condition that two or more parameter reach a certain value or threshold.

To provide an identification information indicating the determined at least one delta encoding package the rule manager in particular permanently stores a delta encoding package identification in the wireless communication device. The bootstrap software later—in particular after a restart of the wireless communication device—retrieves this information from the rule manager by reading out this permanently stored delta encoding package identification.

Generally it is assumed for the inventive method that the at least one delta encoding package is already available in the second storage area. In particular for the latter case of a downloadable delta encoding package it is proposed a method, after the step of detecting a change, comprising the steps of:

downloading at least one delta encoding package from a remote server,
storing downloaded at least one delta encoding package in second storing area, and
providing to the bootstrap software an identification information indicating the downloaded at least one delta encoding package.

Preferably a detected change is the indication about the availability of a new firmware upgrade. Nevertheless it is also envisaged in this embodiment that the rule manager detects the change of another operating parameter and checks the availability of the at least one delta encoding package needed to appropriately adapt the firmware to this changed operating parameter. If the needed at least one delta encoding package is not stored in the second storage unit, it is consequently downloaded from a remote server.

In an alternative variant the rule manager is configured to support the first use of the wireless communication device. Hence it is suggested a method wherein the rule manager is executed upon an initial start of the wireless communication device. The rule manager is configured to execute the steps of:

determining the value of at least one operating parameter,
based on the determined value of the at least one operating parameter determining at least one delta encoding package,
providing to the bootstrap software an identification information indicating the determined at least one delta encoding package,
handing over control to the bootstrap software.

According to this embodiment the envisaged problem is solved by first checking the required operation parameter and to create the second firmware perfectly fitting to the operation environment. The rule manager is in this embodiment in particular called by the bootstrap software during the startup phase. Therefore the termination of the rule manager does not lead to a restart but a direct handover to the bootstrap software.

This solution does not even require a first firmware which is ready to operate, but the needed delta encoding package needs to be available in a storage area if the wireless communication device.

Further it is advantageous to have a general all-purpose delta encoding package available should the first firmware not be ready to operate. This preferably allows creating a ready-to-run second firmware which allows downloading of delta encoding packages which fit the operating environment. For that in particular the rule manager executed upon the initial start of the wireless communication device detects that for the current environment the appropriate delta encoding package is not available. For that situation it is foreseen to store an indication of said general all-purpose delta encoding package preferably plus another indication at least indicating that the firmware is not perfectly fitting to the current environment. When after start of the firmware the rule manager regularly checks for operation parameters, said latter indication is detected and triggers the rule manager to download the appropriate delta encoding package and allows an upgrade to a well-fitting firmware. The latter step preferably comprises a downgrade, if necessary, or is done through an incremental update.

This solution according to this embodiment allows bringing in the field wireless communication devices with a slim general first firmware. All variants for in particular different network operators or other feature requirements are made available by delta encoding packages. The second firmware incorporating all selected features and/or parameters is supposed to be created at the initial start-up time of the respective wireless communication device. Generally it is foreseen that a rule manager is configured to support all presented scenarios.

According to a second aspect of the invention it is proposed a wireless communication device comprising at least one storage unit and a bootstrap software, a first firmware stored in a first storage area, the first storage area being part of the at least one storage unit, at least one delta encoding package stored in at least one second storage area, the second storage area being part of the at least one storage unit, the rule manager being configured to provide identification information indicating at least one delta encoding package (6),
wherein the wireless communication device is configured to:
upon startup retrieve the first firmware from the first storage area,
retrieve from a rule manager identification information indicating at least one delta encoding package,
retrieve the indicated at least on delta encoding package from the second storage area.
combine said first firmware and said at least one delta encoding package to a second firmware by way of a differential upgrade,
start said second firmware.

The second aspect of the invention shares the advantages of the first aspect.

BRIEF DESCRIPTION OF THE DRAWINGS

Other characteristics and advantages of the present invention will appear when reading the following description and annexed drawings of advantageous embodiments given as illustrative but not restrictive examples.

Figure 1:
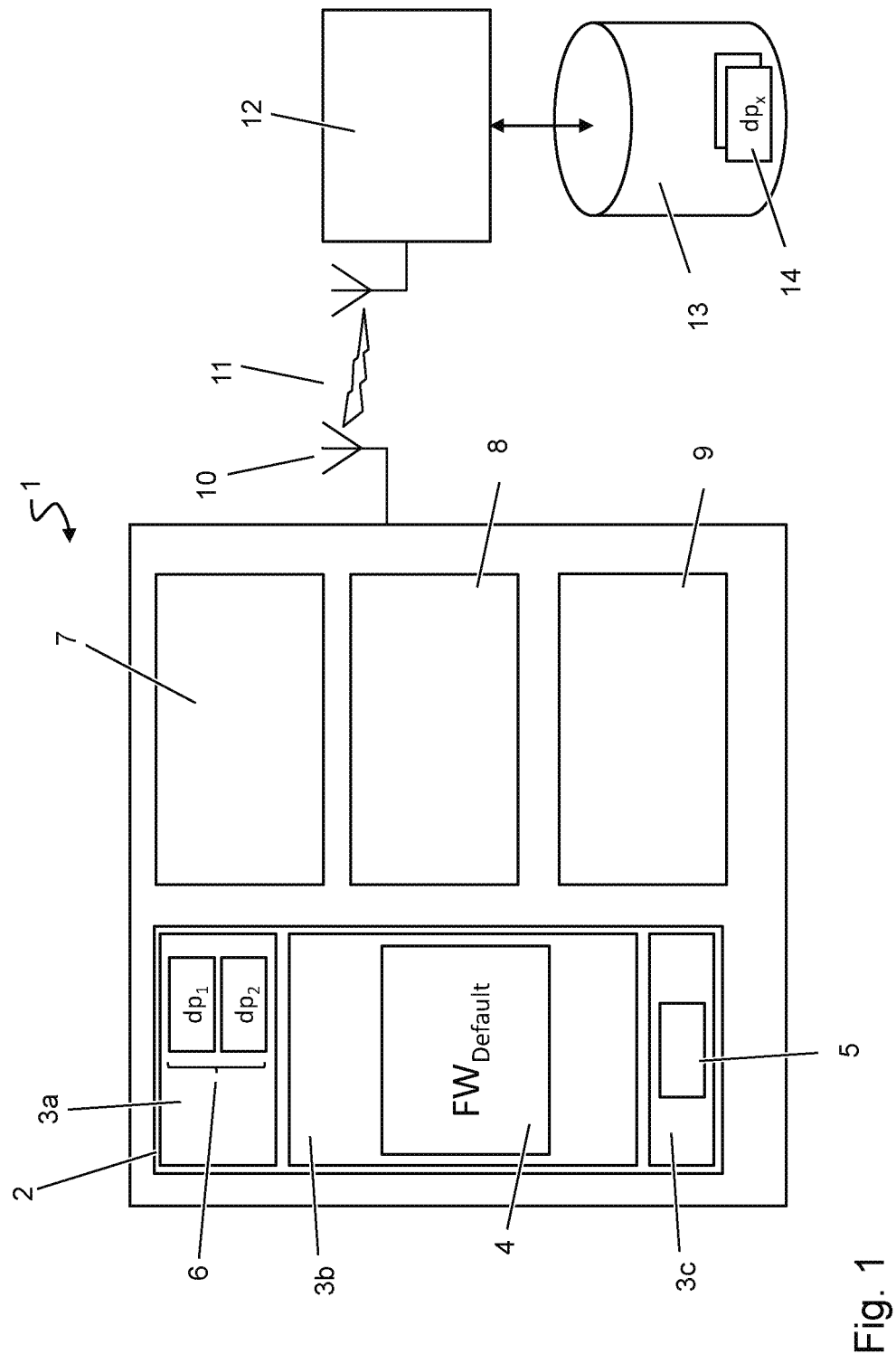
FIG. 1 shows the structural components of an exemplary wireless communication device.

The structure of the flash memory 2 is preferably given from factory and comprises a couple of flash sections 3a, 3b, 3c with different purposes. The flash file system 3a is a storage area where data files can be stored, which in particular are accessible by a hierarchical file path. Here is the preferred place to put delta encoding packages 6, in this example two specific delta encoding packages $dp_1$ and $dp_2$. These delta encoding packages 6 are typically one or a collection of data files in a certain format, e.g. VCDiff, VDelta.

The next flash section 3b is dedicated for the firmware 4. In this embodiment it is a default firmware ($FW_{Default}$), which is an initial firmware, as provided from the factory. Finally in the last depicted flash section 3c the bootstrap software 5 is placed. Usually it is hardcoded that at this section 3c of the flash memory the software is situated which is started upon powering on the wireless communication device 1.

Further components in this exemplary wireless communication device are a read-only-memory area 7, a volatile memory 9, and a communication unit 8. The communication unit 8 is—in connection with the antenna 10—responsible for all communication with wireless networks 11. The wireless networks 11 in particular encompass those supporting cellular network standards like 2G, 3G or 4G, but also other wireless communication standards like Wimax, WLAN, or others. Typically the communication unit comprises a processor which executes the tasks of all units of the wireless communication device 1. Alternatively another control unit separate of the communication unit 8 is available for executing tasks separate from the mere communication protocol related tasks.

The bootstrap software 5 is typically a software program with low complexity, limited access to hardware components, in particular the communication unit 8. It is configured to prepare the start of the firmware by loading it from the flash section for the firmware 4 into the volatile memory 9 and to hand over the control as last step of the starting phase, the so-called booting. Further it is configured to start other dedicated software programs like the rule manager.

There are several scenarios where the embodiments of this invention are of use. The first scenario is a wireless communication device 1 with a firmware 4 that is represented by an initial firmware $FW_{default}$. The wireless communication device 1 is ready to be operated in a couple of wireless networks 11. During lifetime the wireless communication device 1 receives at least one delta encoding package 6, here $dp_1$, in particular through a remote server 12 with a database 13 storing in a table 14 delta encoding packages. The delta encoding package $dp_1$ is dedicated to upgrade the firmware 4 in order to remove bugs or to add new functionality.

The second scenario is a wireless communication device 1 with an initial firmware $FW_{default}$, which is a general firmware 4 which is not necessarily ready to be used in at least one dedicated wireless network 11. It comprises in the flash file system 3a at least one delta encoding package $dp_1$, which includes all adaptations which are necessary to operate the wireless communication device 1 in the at least one wireless network 11. Such adaptations can be parameter modifications e.g. in lookup tables, but also functional adaptations according to functionality for individual approval requirements of the dedicated wireless network 11. Preferably a delta encoding package 6 for each wireless network 11 available in the envisaged region is stored in the flash file system 3a.

A third scenario is a wireless communication device 1 with a firmware $FW_{default}$, which is dedicated for different regional and/or vertical markets out of the box. It is supposed to be deployable in various wireless networks 11.

The adaptations for the different markets are done by delta encoding packages 6 stored in the flash file system 3a. This allows the wireless communication device 1 to be produced as single stock keeping unit (SKU) which fits for many purposes. This scenario faces the growing need for a variety of functional and configurative adaptations of the wireless communication devices. Based on the same single SKU a wireless communication device 1 is in particular transformed by the inventive method into a wireless communication device 1 which is e.g. either adapted for use for the European eCall initiative or for electronic metering devices in Australia or for a home security appliance in the United States.

With the following discussion of the process steps it is shown how the inventive method is to be carried out for fulfilling the needs of the different scenarios.

Figure 2:
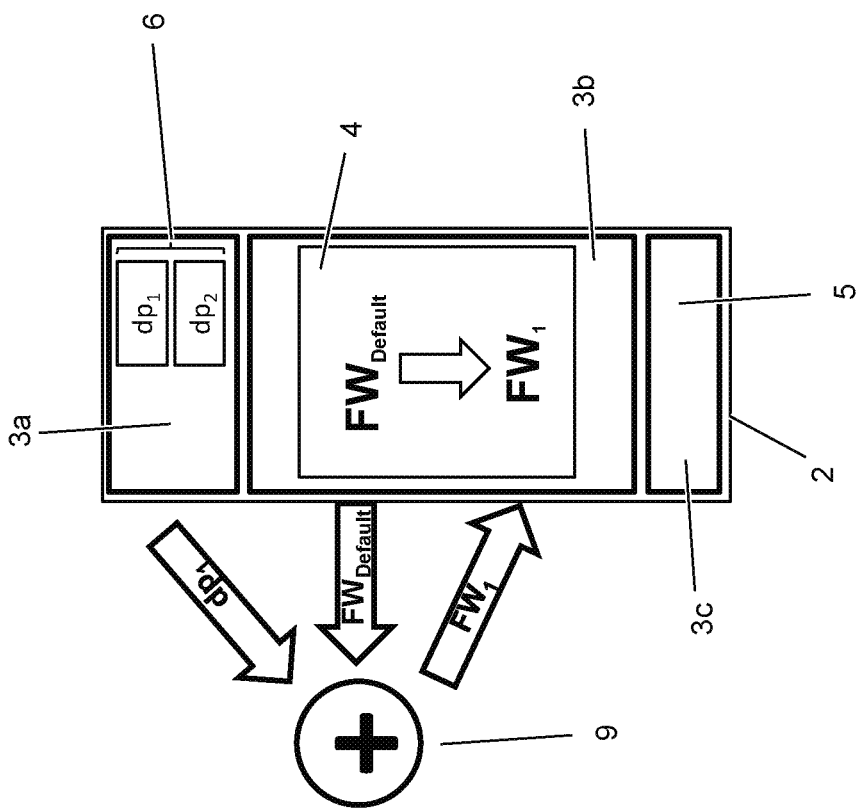
FIG. 2 shows the process steps for upgrading the firmware

FIG. 2 shows the basic upgrade procedure based on a first firmware $FW_{Default}$ and one delta encoding package $dp_1$ by showing only the structure of the flash memory and accesses thereto.

The combining procedure is started preferably by the bootstrap software 5 which is stored in flash section 3c. The bootstrap software 5 received an indication about an available delta encoding package which is to be used for an upgrade of the current firmware 4. This indication is according to the invention provided by a rule manager software.

For that upgrade the first firmware $FW_{Default}$ is loaded from the firmware flash section 3b preferably into the volatile memory 9 of the wireless communication device 1. The upgrade operations stored in the delta encoding package $dp_1$ are stepwise executed on the first firmware $FW_{default}$, now available in the volatile memory 9. The result of the adaptation operations is the second firmware $FW_1$. This is consequently stored in the firmware flash section 3b by overwriting the first firmware $FW_{default}$. Now, when the wireless communication device 1 would be restarted, the new firmware $FW_1$ is ready to be used stored in the firmware flash section 3b.

The described procedure is applicable for all described scenarios, based on the assumption that the upgraded second firmware is stored in the firmware flash section 3b. In particular the first and third scenario takes most advantage as these are mainly focused on one time upgrades, for the first scenario during lifetime, for the third scenario at the beginning. For that it is preferably to once execute the upgrade, and permanently store the result in the flash memory 2.

Figure 3:
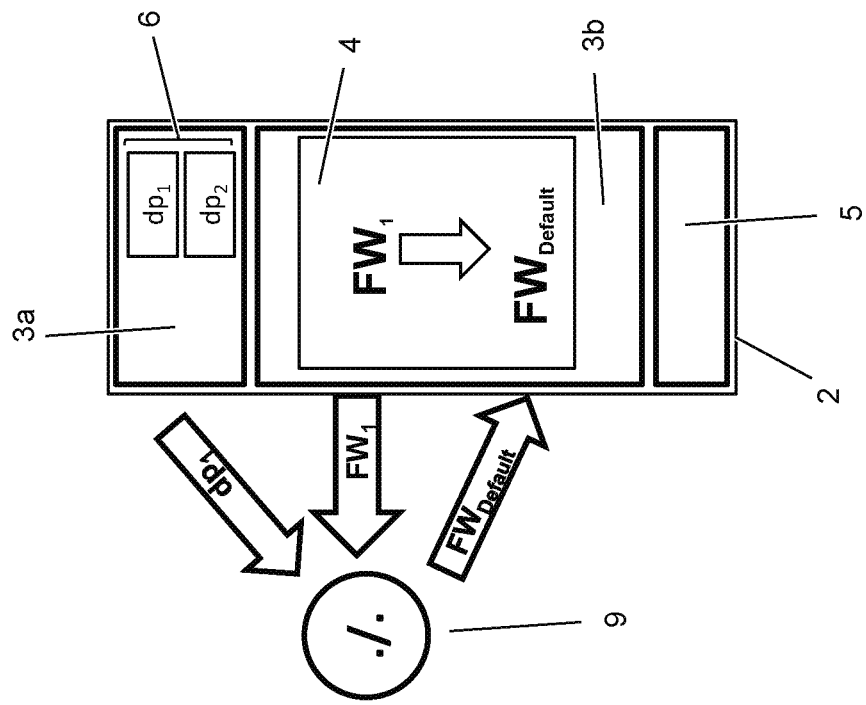
FIG. 3 shows the process steps for downgrading the firmware

FIG. 3 shows the inverse procedure of downgrading. Here the procedure starts with the previously upgraded firmware $FW_1$ stored in the firmware flash section 3b. It is to be expected that the upgrade process has happened a while ago. It is even possible that a couple of upgrade procedures have been carried out, in particular incremental ones. This could have happened at once, or with time gaps, in any case it was done by utilizing at least one delta encoding package 6 per upgrade procedure.

Again the bootstrap software 5 was triggered at startup by identifying at least one specific delta encoding package 6. The delta encoding package 6 has to comply with the delta encoding package $dp_1$ used for the upgrade procedure. Depending on the differential upgrade technology, the delta encoding package is the same package or a different one. In this case it is assumed to be the same delta encoding package $dp_1$.

With that delta encoding package $dp_1$ then the downgrading procedure is again carried out. For that the second firmware $FW_1$ is loaded in the volatile memory 9 of the wireless communication device 1. There the adaptation operations of delta encoding package $dp_1$ are executed. This results in the original firmware $FW_{Default}$, which is then stored in the firmware flash section 3b. After this step, the wireless communication device 1 is in the same operational status as it was before the upgrade procedure described before was started.

This procedure is in particular applicable for the second scenario, when the wireless communication device 1 is supposed to be used in different wireless networks 11 with different parameter-wise or functional requirements.

In this scenario it is moreover recommended to consecutively execute the two procedures of downgrading and afterwards upgrading, the latter with a different delta encoding package $dp_2$, according to the described procedures. This delta encoding package $dp_2$ consists all the adaptations for the firmware 4 necessary to operate it in the designated wireless network 11.

Figure 4:
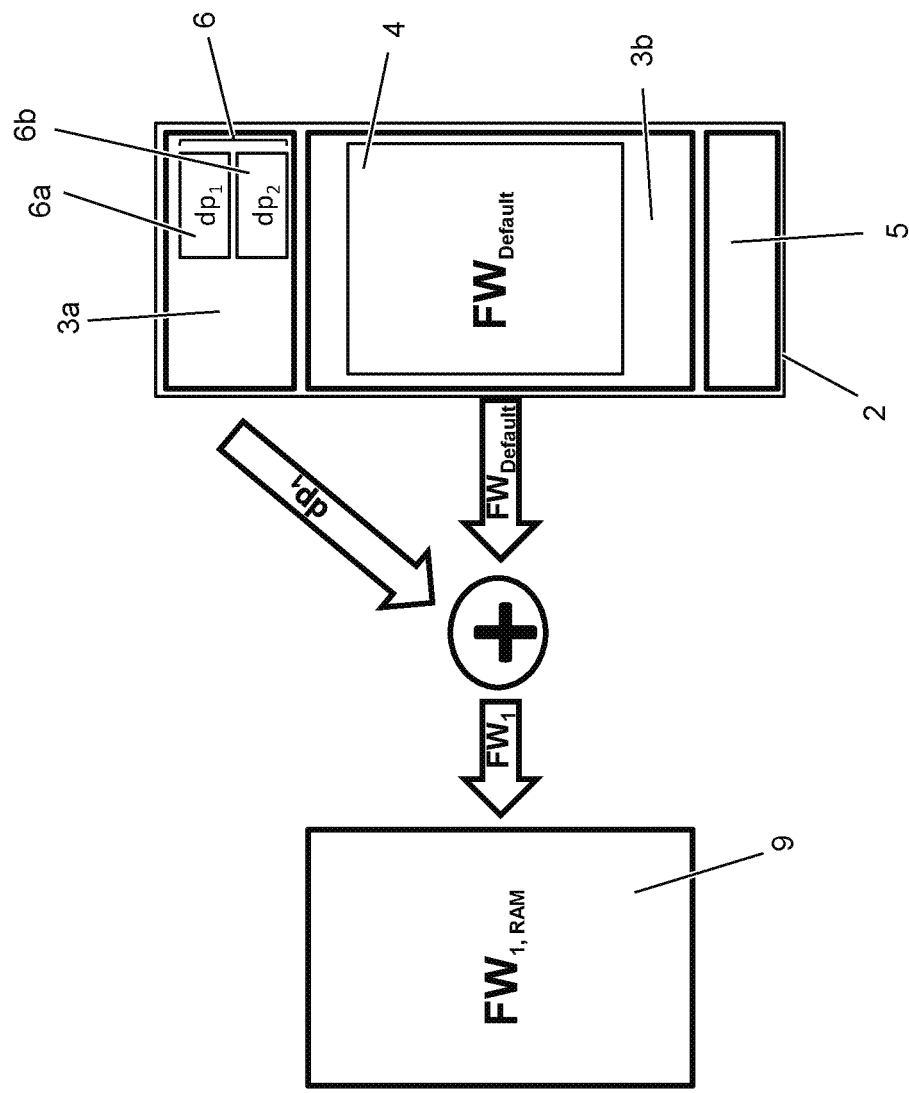
FIG. 4 shows the process step for upgrading the firmware according to a further variant of the inventive method

FIG. 4 shows another embodiment of the inventive method, which is the upgrade procedure without storing the upgraded second firmware $FW_1$ in the firmware flash section 3b. The procedure starts similar to the previously described procedures with powering on the wireless communication device 1. This gives the control to the bootstrap software 5. The bootstrap software 5 detects an indication from the rule manager about at least one delta encoding package $dp_1$ for upgrading the initial firmware $FW_{Default}$. In response the depicted delta encoding package $dp_1$ is retrieved from its storage area, here the flash file system 3a.

The initial firmware $FW_{Default}$ then is retrieved from its storage area, which is in this example the firmware flash section 3b. Depending on the implementation of the differential upgrade procedure the upgrading is preferably done already during retrieval of the firmware $FW_{Default}$ from its storage area 3a. For this, the delta encoding package $dp_1$ is preferably organized sequentially, which means the plurality of adaptation operations are ordered according to the position of the operation within the firmware 4. Additionally it is preferred that the differencing algorithm may handle the original firmware data in so-called source windows, that is packages of the overall firmware 4, limited in size, which are handled separately. For this embodiment it is therefore advantageous to individually retrieve such source windows of the initial firmware $FW_{Default}$ from the storage area 3b.

Generally the delta encoding package 6 comprises a sequence of string matching and delta instructions that are operated on the retrieved firmware data, the source, in order to create the upgraded firmware data, the target.

Such instructions comprise different types of instructions. For VCDIFF it is in particular defined: ADD, COPY, and RUN. ADD inserts a certain part, preferably a string of bytes, to the target. This part is typically not available in the source. COPY takes from the source a certain part which remains unchanged in the target. RUN simplifies the ADD command by repeatedly inserting a string of bytes or a single byte. It becomes obvious that the target is created at another place than the source. Further memory shifting operations etc. can accompany the procedure of combination of the firmware $FW_{Default}$ with delta encoding package $dp_1$.

When all source windows are handled and all instructions of all identified delta encoding packages 6 are executed, the upgraded firmware $FW_1$ is available in the volatile memory 9 and ready to be started.

Due to the fact that the stored original firmware $FW_{Default}$ is never overwritten in its storage area, it is recommended for this variant to store the original firmware in a read-only-memory 7. Such the firmware $FW_{Default}$ is in this case typically put in by a burning process in the read-only-memory 7 already in factory.

This embodiment is preferably applicable to the second scenario and partly for the third scenario, provided the wireless communication device 1 will be used for different regional or vertical markets.

Figure 5:
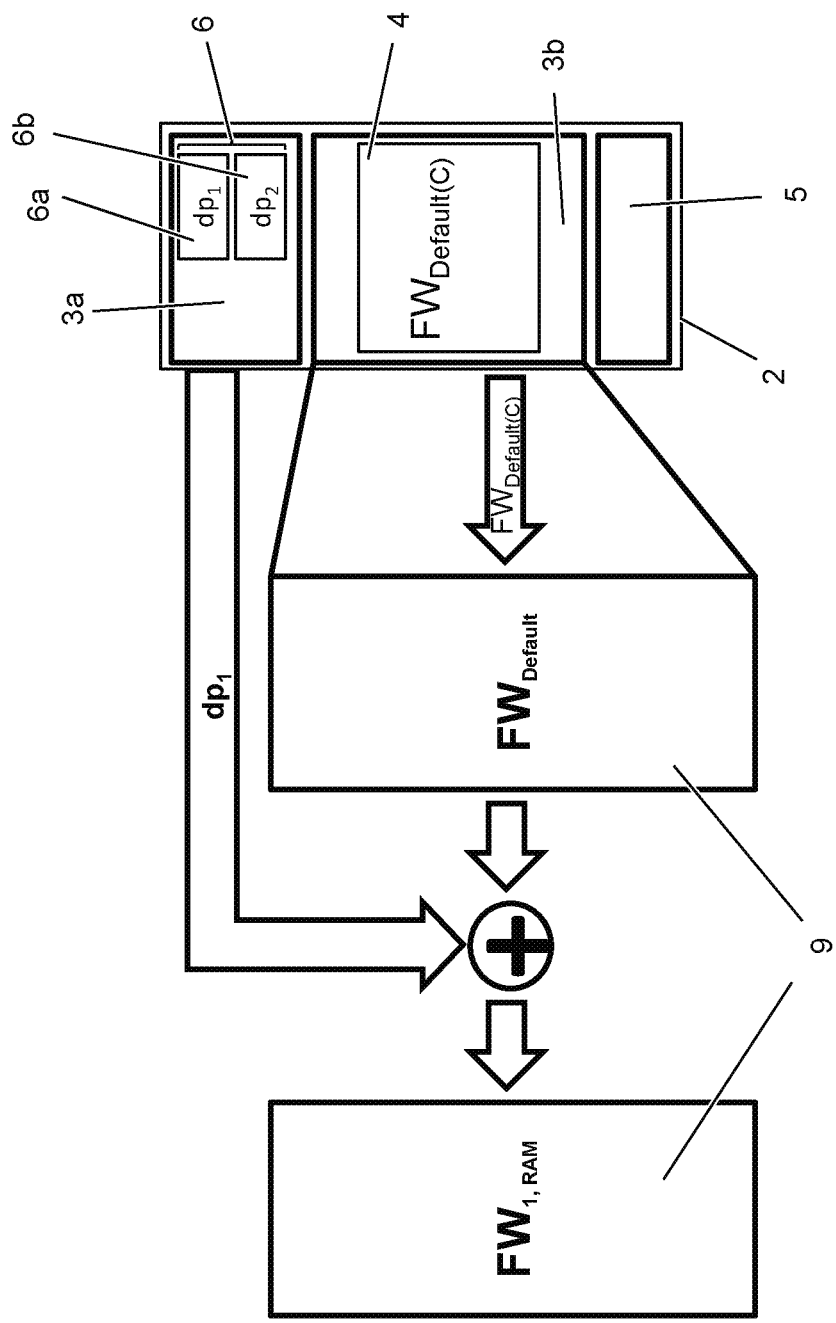
FIG. 5 shows the process step for upgrading the firmware according to a another variant of the inventive method

FIG. 5 shows a variation of the previously described procedure. Here at least the initial firmware $FW_{Default}$ is stored in compressed form $FW_{Default(c)}$ in its storage area 3b (or the read-only-memory 7 accordingly). The combination procedure is modified compared to the previously described embodiment in that the step of retrieving of the firmware first encompassed a reading step and then an uncompressing step. By that the initial firmware $FW_{Default}$ is according to this exemplary embodiment placed first in the volatile memory 9. Afterwards the combination by means of the instructions of the delta encoding package $dp_1$ takes part and results in the upgraded firmware $FW_1$ now in the volatile memory 9.

For the case of the previously mentioned embodiment, that the initial firmware $FW_{Default}$ is stored in separate source windows it is recommended to store these source windows in individually compressed form. So each source window is retrieved and uncompressed into the volatile memory 9, and then used for the combination step with the delta encoding package $dp_1$. This adaptation requires less available volatile memory 9 for executing the uncompressing step in conjunction with the combination step.

Generally there is no difference in terms of applicability of the process to the mentioned scenarios compared to the previously described variant. To compress stored firmware and/or delta encoding package data is driven by limited storage resources.

Figure 6B:
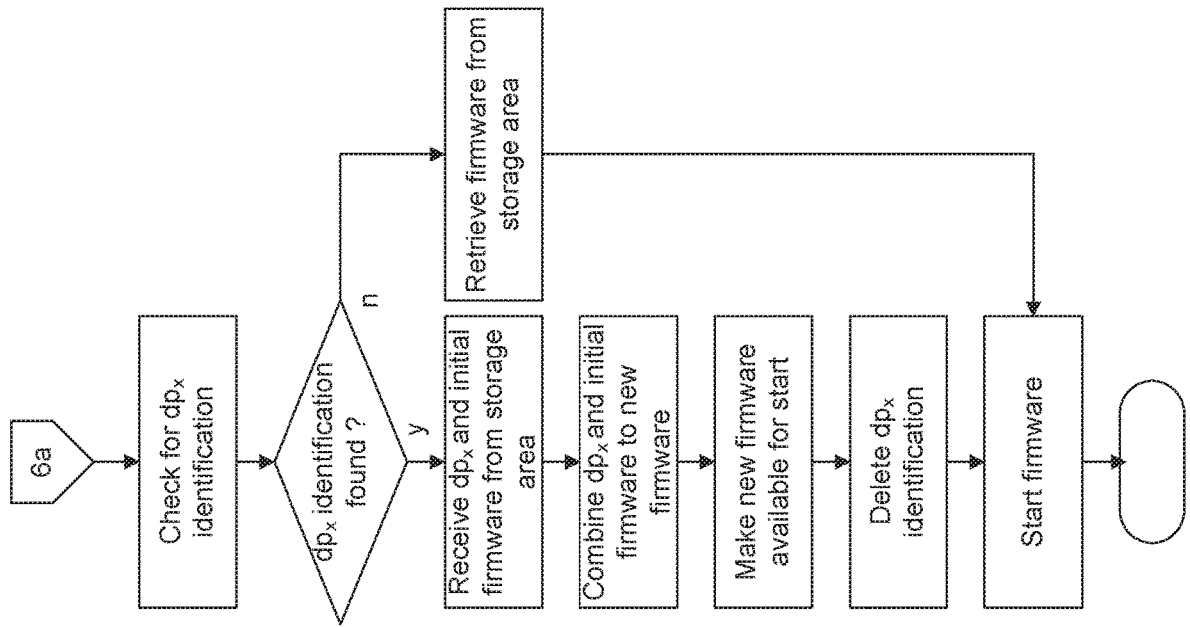
FIGS. 6a and 6b show flow diagrams illustrating an exemplary embodiment of the inventive method FIG. 1 schematically shows the components of an exemplary wireless communication device according to the invention. The basic components are shown irrespective of the fact if the wireless communication device is a complete ready to use device, like a mobile handset, or a M2M module built in an electronic device. In the following both variants are called wireless communication device 1. The wireless communication device 1 comprises a storage unit, in particular a flash memory 2. Depending on the requirements in terms of readability, read- and write-cycles and environmental impacts (temperature, light, humidity) other memory technologies may be appropriate. Which type of permanent memory technology is used is of no relevance for the inventive method.
Figure 6A:
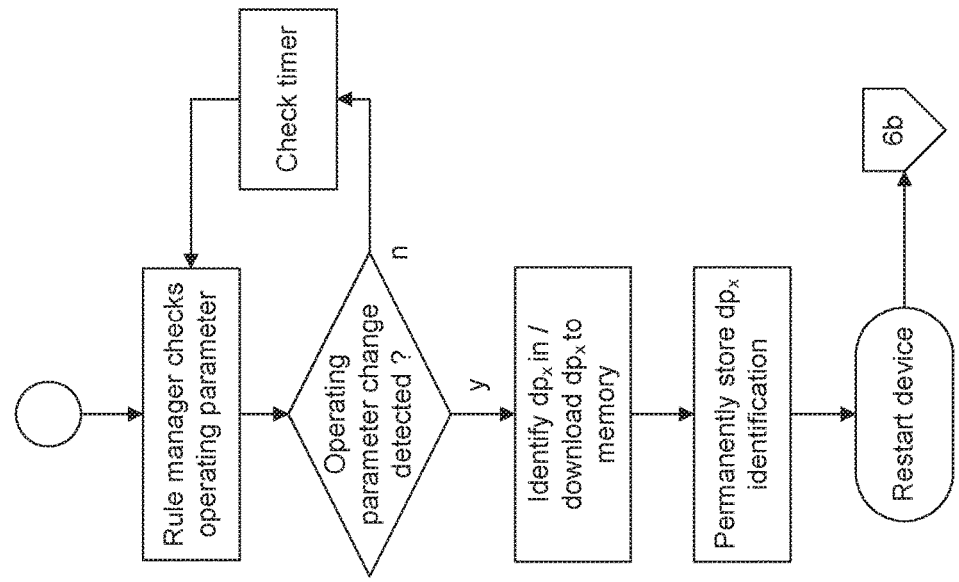

FIGS. 6A and 6B show in a flowchart the overall process of the upgrading procedure in particular for the first and second scenario, which is that during runtime a change of operating parameter is detected by the rule manager. Adaptations for applying to the third scenario are mentioned during description.

The process starts at the rule manager which is in this embodiment regularly checking the monitored operating parameter. Such operating parameter can be a parameter of the wireless network 11, in particular the network operator or country, typically indicated by mobile network code (MNC) and mobile country code (MCC). It can further be data regarding an available downloadable delta encoding package, in particular received through an incoming message or as a result of a regular request to a remote server 12 making available the respective delta encoding packages 6.

When no parameter change is detected the rule manager is started after the expiration of a timer anew to check for change of relevant operating parameter. Other event based triggers are also advantageous, in particular upon a fulfilled network registration procedure, or a reception of a message from said remote server 12.

If a parameter change is detected, this indicates that an upgrade process is about to be started. For that the rule manager identifies if the delta encoding package $dp_x$ fitting for the detected parameter change is available. If e.g. for a specific network operator T a specific delta encoding package $dp_T$ is needed, it is checked by the rule manager, if this delta encoding package $dp_T$ is stored in the flash file system 3a of the wireless communication device 1. If not, it is downloaded from a remote server 12 into the flash file system.

Out of simplicity reasons it is assumed in the following, that for an upgrade procedure one delta encoding package $dp_x$ is sufficient. It could however also mean to execute two or more consecutive upgrades with two or more delta encoding packages $dp_{x,y,z}$.

In any case the rule manager permanently stores a delta encoding package identification depicting delta encoding package $dp_x$ for the required upgrade process of the firmware. The delta encoding package identification is stored in a place accessible for the bootstrap software 5. Afterwards a restart of the wireless communication device 1 is launched.

For the case of the third scenario, the rule manager is preferably started from the bootstrap software and then no restart is needed. This is advantageous as with that upon first startup of the wireless communication device 1 directly the envisaged firmware 4 is created. For a single stock keeping unit equipped with different delta encoding packages 6 a single configuration change relative to the permanently stored delta encoding package identification can thus let the wireless communication device 1 boot with different firmwares.

For that the delta encoding package 6 has however to be available in the flash file system as from the bootstrap software 5 no access to remote servers for downloading packages is typically available.

The subsequent tasks handled by the bootstrap software 5 are shown in FIG. 6b. In a first step the bootstrap software 5 retrieves from the rule manager identification information indicating a delta encoding package by reading out the permanently stored delta encoding package identification. If no such delta encoding package identification is available, the bootstrap software 5 knows that no upgrade is needed and simply retrieves the stored firmware 4 from its storage area and start the firmware 4.

If a valid delta encoding package identification is available, the bootstrap software 5 receives the identified delta encoding package $d_x$ and the firmware $FW_{Default}$ from its respective storage areas and combines them as described above by way of differential upgrade to a second firmware $FW_1$. The steps of retrieving and combining are of course preferably interlaced, in particular when the firmware $FW_{Default}$ is stored in form of source windows, as described before.

Depending upon the strategy the created second firmware $FW_1$ is in a further step preferably stored into the respective storage area 3b, most likely by overwriting the initial firmware $FW_{Default}$ stored in the storage area 3b.

If further steps are needed for starting the second firmware $FW_1$, in particular loading of other software modules like drivers, setting of configurations etc., this is carried out now.

For the case that the created second firmware $FW_1$ is permanently stored in the storage area of the flash memory 2, the delta encoding package identification needs to be deleted. This is not applicable for the variant, that no permanent storage of the second firmware $FW_1$ is carried out, which means that the upgrade process is to be conducted with each startup of the wireless communication device 1.

As last step the bootstrap software 5 starts the second firmware $FW_1$ now available in the volatile memory 9 by setting the processor counter to the entry address of the second firmware $FW_1$ in the volatile memory 9.

The invention claimed is:

1. A method for adapting a firmware configured to control a wireless communication device, the wireless communication device comprising at least one storage unit, a bootstrap software and a rule manager, wherein a first firmware is stored in a first storage area, the first storage area being part of the at least one storage unit, at least one delta encoding package is stored in at least one second storage area, the second storage area being part of the at least one storage unit, and the rule manager is configured to provide identification information indicating the at least one delta encoding package, the method comprising the steps, for the bootstrap software:
    upon startup retrieving the first firmware from the first storage area,
    retrieving from the rule manager identification information indicating the at least one delta encoding package, comprising the steps for the rule manager of:
    determining a value of at least one operating parameter, wherein the operating parameter is indicative of a wireless network designated to be used by the wireless communication device,
    based on the determined value of the at least one operating parameter, determining at least one delta encoding package,
    providing to the bootstrap software identification information indicating the determined at least one delta encoding package,
    handing over control to the bootstrap software,
    retrieving the indicated at least one delta encoding package from the second storage area,
    combining said first firmware and said at least one delta encoding package to a second firmware by way of a differential upgrade, and
    starting said second firmware, wherein the rule manager is configured to execute the steps of:
    checking for a change of an operating parameter,
    in case a change is detected:
        determining at least one delta encoding package based on changed operating parameter,
        providing to the bootstrap software identification information indicating the determined at least one delta encoding package, and
        handing over control to the bootstrap software.

2. The method according to claim 1, further comprising: a step of combining the first firmware with at least two delta encoding packages comprises an incremental update of the first firmware by updating the first firmware by the at least two delta encoding packages in order defined by the identification information retrieved from the rule manager.

3. The method according to claim 1, the wireless communication device comprising a volatile memory, wherein the method comprises, after the step of combining,
storing the second firmware in the first storage area, and the step of starting the second firmware comprises:
loading second firmware from the first storage area in volatile memory, and
executing said loaded second firmware.

4. The method according to claim 3,
wherein at least two delta encoding packages are stored in the at least one second storage area, the two delta encoding packages comprising at least: a downgrade package and an upgrade package,
wherein the step of combining comprises the following steps:
executing a differential downgrade of the first firmware by differential downgrade instructions being part of the downgrade package,
storing result of the differential downgrade in the first or the second storage area,
executing differential upgrade of the result of differential downgrade by differential upgrade instructions being part of the upgrade package, and
storing result of the differential upgrade as the second firmware in the first storage area.

5. The method according to claim 1, wherein the first storage area is a non-rewriteable memory.

6. The method according to claim 1,
wherein at least one out of the group of first firmware and at least one delta encoding package being stored in the respective storage area in compressed form, hereinafter stored item, the retrieving step comprising:
reading respective stored item
uncompressing read stored item.

7. The method according to claim 1, wherein the rule manager is executed upon an initial start of the wireless communication device.

8. The method according to claim 1,
wherein the rule manager is configured to, after checking detecting a change of the at least one operating parameter, execute the steps of:
downloading the at least one delta encoding package from a remote server,
storing downloaded at least one delta encoding package in the second storing area, and
providing to the bootstrap software the identification information indicating the downloaded at least one delta encoding package.

9. A wireless communication device comprising at least one storage unit and a bootstrap software, a rule manager, and a first firmware stored in a first storage area, the first storage area being part of the at least one storage unit,
at least one delta encoding package stored in at least one second storage area, the second storage area being part of the at least one storage unit,
the rule manager being configured to provide identification information indicating at least one delta encoding package, wherein the wireless communication device is configured to:
upon startup retrieve the first firmware from the first storage area,
retrieve from the rule manager identification information indicating at least one delta encoding package,
wherein the rule manager is configured to:
determine a value of at least one operating parameter, wherein the operating parameter is indicative of a wireless network designated to be used by the wireless communication device,
determine, based on the determined value of the at least one operating parameter, at least one delta encoding package,
provide to the bootstrap software an identification information indicating the determined at least one delta encoding package, and
hand over control to the bootstrap software,
retrieve the indicated at least on delta encoding package from the second storage area,
combine said first firmware and said at least one delta encoding package to a second firmware by way of a differential upgrade, and
start said second firmware, wherein the wireless communication device comprising a rule manager, configured to:
check for a change of an operating parameter, and
in case a change is detected:
determine at least one delta encoding package based on changed operating parameter,
provide to the bootstrap software an identification information indicating the determined at least one delta encoding package, and
hand over control to the bootstrap software.

10. The wireless communication device according to claim 9, further comprising a volatile memory, the wireless communication device is further configured to:
after combining to said second firmware, store the second firmware in the first storage area, and
and starting said second firmware comprises loading second firmware from first storage area in the volatile memory and executing said loaded second firmware.

11. The wireless communication device according to claim 10,
further comprising at least two delta encoding packages stored in the at least one second storage area, the two delta encoding packages comprising at least a downgrade package and an upgrade package,
wherein the wireless communication device is configured to: for combining to said second firmware:
execute a differential downgrade of the first firmware by differential downgrade instructions being part of the downgrade package,
store the result of differential downgrade in a first or second storage area,
execute differential upgrade of the result of differential downgrade by differential upgrade instructions being part of the upgrade package, and
store the result of differential upgrade as second firmware in the first storage area.

12. The wireless communication device according to claim 9, the wireless communication device is configured to execute the rule manager upon initial start.

13. The wireless communication device according to claim 9, wherein the rule manager is further configured to:
after detecting a change of said operating parameter, download at least one delta encoding package from a remote server,
store downloaded at least one delta encoding package in second storing area, and provide to the bootstrap software an identification information indicating the downloaded at least one delta encoding package.

\* \* \* \* \*